(12) United States Patent
Geehan et al.

(10) Patent No.: US 9,915,112 B2
(45) Date of Patent: Mar. 13, 2018

(54) SMART SHAKER ROOM

(71) Applicant: M-I LLC, Houston, TX (US)

(72) Inventors: Thomas Geehan, Houston, TX (US);
Bradley Jones, Crestview Hills, KY
(US); Eric Cady, Walton, KY (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 14/893,000

(22) PCT Filed: Jun. 16, 2014

(86) PCT No.: PCT/US2014/042501
§ 371 (c)(1),
(2) Date: Nov. 20, 2015

(87) PCT Pub. No.: WO2014/201457
PCT Pub. Date: Dec. 18, 2014

(65) Prior Publication Data
US 2016/0090799 A1 Mar. 31, 2016

Related U.S. Application Data

(60) Provisional application No. 61/835,396, filed on Jun. 14, 2013, provisional application No. 61/847,704, filed on Jul. 18, 2013.

(51) Int. Cl.
*E21B 21/06* (2006.01)
*B01D 33/03* (2006.01)
*B01D 33/80* (2006.01)
*G05B 15/02* (2006.01)

(52) U.S. Cl.
CPC ............ *E21B 21/065* (2013.01); *B01D 33/03* (2013.01); *B01D 33/804* (2013.01); *G05B 15/02* (2013.01)

(58) Field of Classification Search
None
See application file for complete search history.

(56) References Cited

U.S. PATENT DOCUMENTS

| | | | |
|---|---|---|---|
| 2007/0187299 A1* | 8/2007 | Valerio | B03B 5/44 209/12.1 |
| 2008/0040945 A1* | 2/2008 | Buckner | E02F 3/8816 34/406 |
| 2008/0078700 A1* | 4/2008 | Jones | B07B 1/42 209/269 |

(Continued)

*Primary Examiner* — Richard Gurtowski
(74) *Attorney, Agent, or Firm* — David J. Smith (57) ABSTRACT

This disclosure is generally drawn to systems, devices, apparatuses, and/or methods, related to monitoring a shaker used for separating solids from fluid. Specifically, the disclosed systems, devices, apparatuses, and/or methods relate to controlling an actuated arm to inspect, remove, replace, repair, clean, and/or install screen assemblies based on monitoring the shaker and its screen assemblies. In some examples, a system may include an actuated arm, a monitoring tool, and a controller. The actuated arm may be adjacent a shaker for separating one or more solids from a fluid. The monitoring tool may be coupled to the actuated arm and may monitor a screen assembly in the shaker. The controller may be in electrical communication with the actuated arm and the monitoring tool, and may control the actuated arm based on the monitoring of the screen assembly.

19 Claims, 7 Drawing Sheets

(56) References Cited

U.S. PATENT DOCUMENTS

| | | | | |
|---|---|---|---|---|
| 2010/0276343 A1* | 11/2010 | Hukki | ............ | B07B 1/46 |
| | | | | 209/405 |
| 2012/0222854 A1* | 9/2012 | McClung, III | ........ | E21B 21/065 |
| | | | | 166/75.12 |
| 2014/0138323 A1* | 5/2014 | Jones | ............ | E21B 21/065 |
| | | | | 210/739 |

* cited by examiner

SMART SHAKER ROOM

BACKGROUND

Shakers that separate solids from fluids are used in many industries. In oilfield environments, for example, shakers separate solids (e.g., drill cuttings, particulates) from drilling fluid.

The area of an oil rig site used to mount shakers and related solids control equipment is very rudimentary and dangerous to human operators. On offshore rigs, for example, there is a shaker room with HVAC to remove potential volatile organic compounds, steam, and the like from the environment. Instrumentation in a shaker room is typically ruggedized to survive the vibrations and hostile environment. Further, such conditions make for a hostile working environment for humans, and many times access to this working environment is restricted.

BRIEF DESCRIPTION OF THE DRAWINGS

The foregoing and other features of the present disclosure will become more fully apparent from the following description and appended claims, taken in conjunction with the accompanying drawings. Understanding that these drawings depict several examples in accordance with the disclosure and are, therefore, not to be considered limiting of its scope, the disclosure will be described with additional specificity and detail through use of the accompanying drawings.

In the drawings.

DETAILED DESCRIPTION

In the following detailed description, reference is made to the accompanying drawings, which form a part hereof. In the drawings, similar symbols identify similar components, unless context dictates otherwise. The illustrative examples described in the detailed description and drawings are not meant to be limiting and are for explanatory purposes. Other examples may be utilized, and other changes may be made, without departing from the spirit or scope of the subject matter presented herein. It will be readily understood that the aspects of the present disclosure, as generally described herein, and illustrated in the drawings, may be arranged, substituted, combined, and designed in a wide variety of different configurations, each of which are explicitly contemplated and made part of this disclosure.

This disclosure is generally drawn to systems, devices, apparatuses, and/or methods, related to monitoring a shaker used for separating solids from fluid. Specifically, the disclosed systems, devices, apparatuses, and/or methods relate to controlling an actuated arm to inspect, remove, replace, repair, clean, and/or install screen assemblies based on monitoring the shaker and its screen assemblies.

Figure 1A:
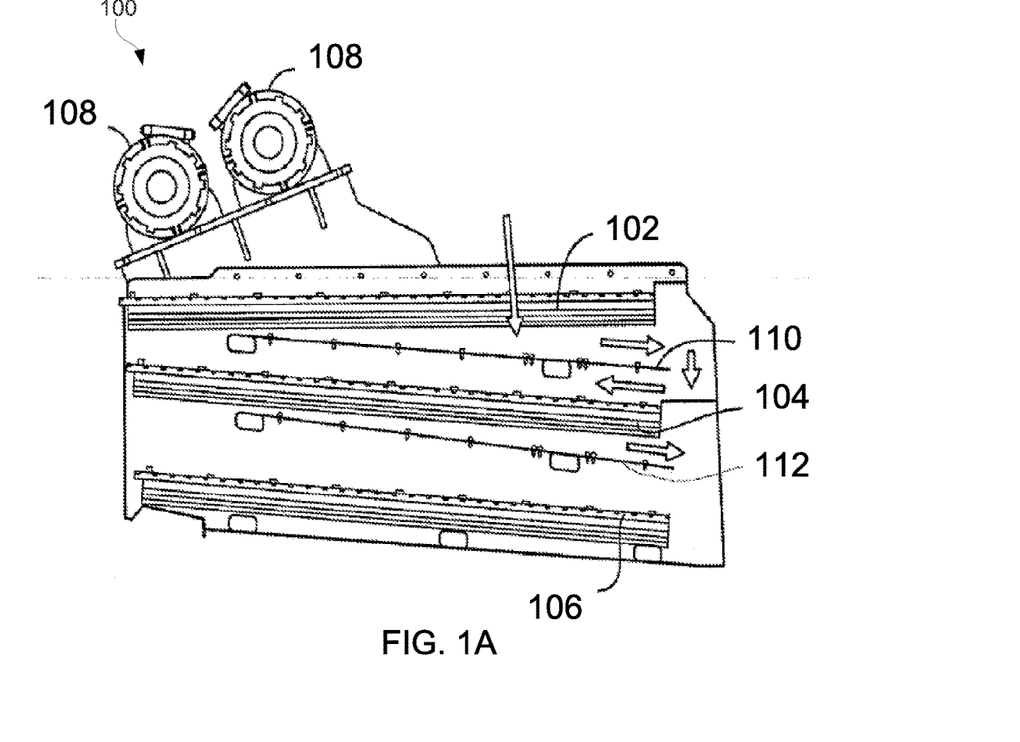
FIGS. 1A and 1B are side and perspective views, respectively, of a shaker.
Figure 1B:
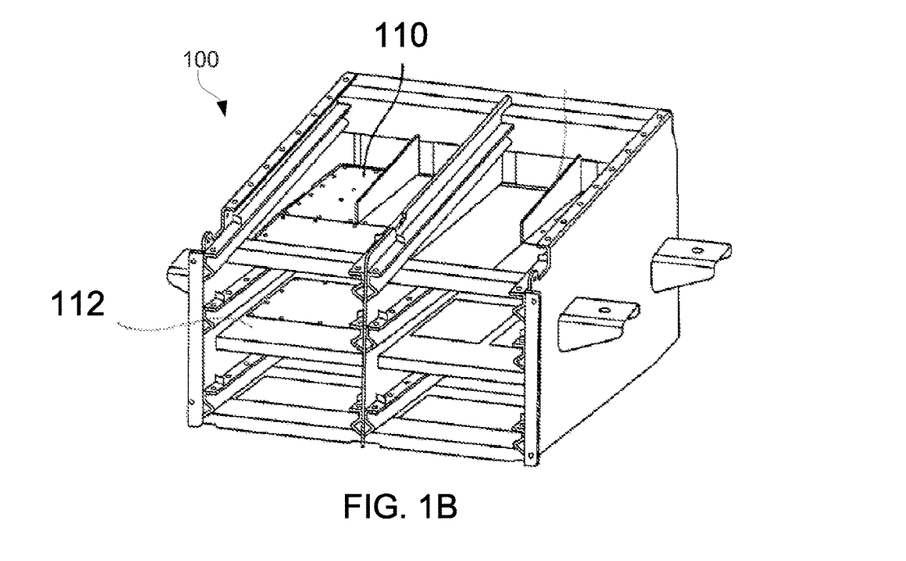

Referring now to FIGS. 1A and 1B, a cross-sectional view of a shaker 100 in accordance with one or more examples of the present disclosure is shown. The shaker 100 may include one or more screening decks, such as by including a top screening deck 102, one or more middle screening decks 104, and a bottom screening deck 106, as shown. Motor(s) 108 may also be attached to the shaker 100 to provide vibratory motion to assist with separating solids from fluid (e.g., drilling fluid) within the shaker 100.

Screen assemblies, which may include a mesh screen, may be provided on each of the screening decks 102, 104, and 106. As such, the screen assemblies may be installed within shaker 100 to filter out solids of various sizes from the drilling fluid according to the size of the respective mesh of the screen assembly. In some examples, the screen assembly be disposed on top of the screening decks 102, 104, and 106. In some examples, multiple screen assemblies may be installed in each of the screening decks 102, 104, and 106. These screen assemblies may be installed in series from an inlet end of the shaker 100 to an outlet end of the shaker 100. Those of ordinary skill in the art will appreciate that the present disclosure is not limited to any particular screen assembly or mesh screen arrangement.

Some examples disclosed herein relate to systems, devices, apparatuses, and/or methods that include an actuated arm operatively coupled to the shaker 100. As used herein, "operatively coupled" may be used herein to refer to having an actuated arm coupled with and/or adjacent the shaker 100 such that the actuated arm may operate with, interact with, and/or be used in conjunction with the shaker 100. An actuated arm may be operatively coupled to the shaker 100 such that the actuated arm may be used for purposes of monitoring the shaker 100 and the fluid and solids being processed by the shaker 100. The actuated arm may be disposed adjacent or in proximity to shaker 100 or between multiple shakers 100, such as by arranging the actuated arm on a floor of a drilling rig with the shaker 100, positioning the actuated arm on a post in proximity to the shaker 100, connecting the actuated arm to a rail disposed above the shaker 100, or any other configuration or arrangement such that the actuated arm may operate and be used in conjunction with the shaker 100.

The actuated arm may include one or more actuators therein or operatively coupled thereto, such as to impart movement to the actuated arm. An actuator used in accordance with some examples disclosed herein may include an electrical, mechanical, hydraulic, pneumatic, and/or any other actuator known in the art, in which the actuator may be controlled remotely or locally.

In accordance with some examples of the present disclosure, the actuated arm may include tool(s) to facilitate monitoring and/or inspecting of the shaker 100. For example, the actuated arm may include an imaging device (e.g., camera) configured to inspect the screen assembly of the shaker 100, may include a light source configured to emit light therefrom, may include a nozzle configured to emit a cleaning fluid therefrom, and/or may include a sampling device configured to sample the drilling fluid within the shaker 100.

Figure 2:
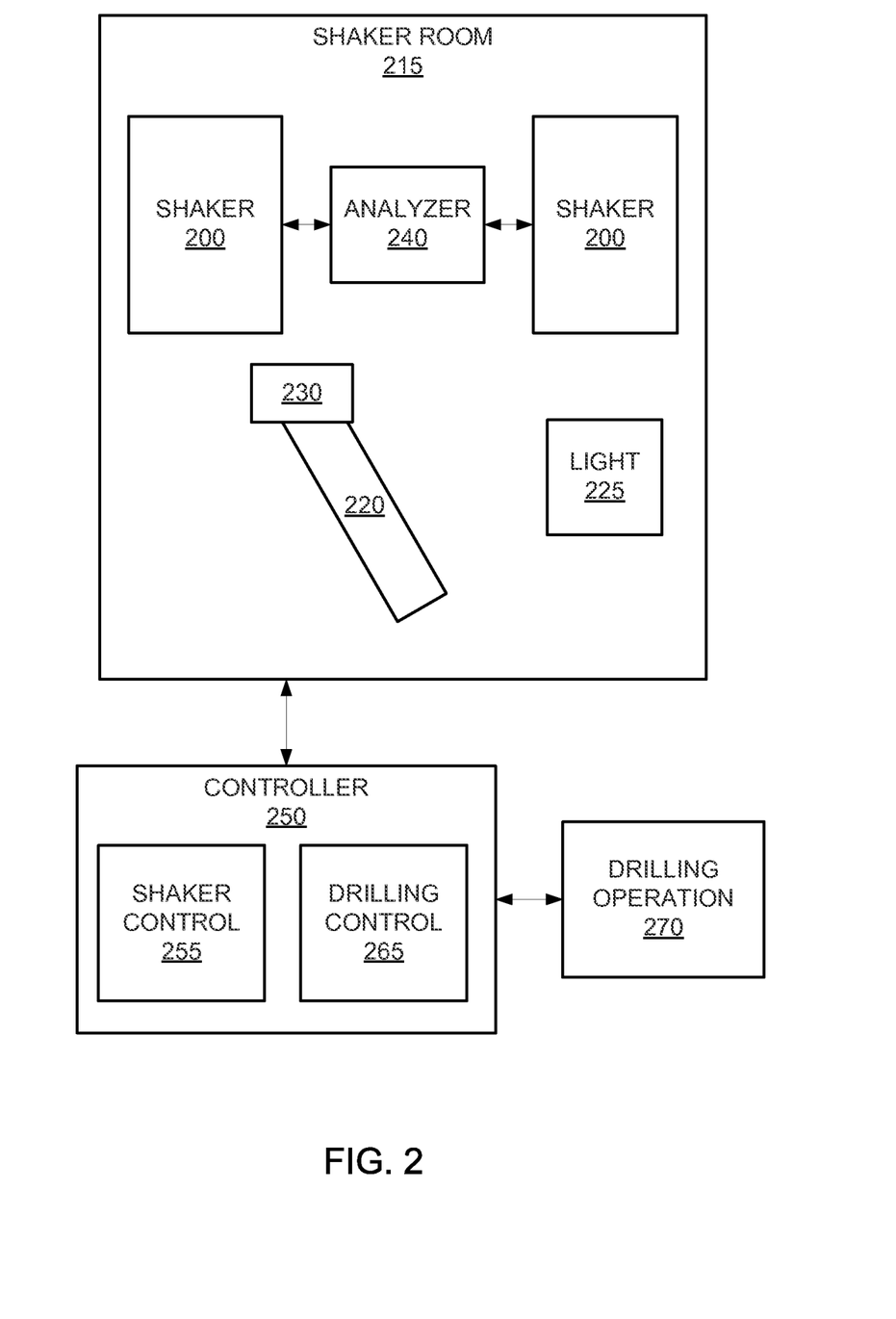
FIG. 2 is a schematic representation of an example shaker monitoring system.

FIG. 2 is a schematic view of an example shaker room 215 including shakers 200 and a monitoring tool 230 for monitoring the shaker room 215, arranged in accordance with some examples of the present disclosure. Some examples may include shakers 200, monitoring tool(s) 230 coupled to an actuated arm 220, an analyzer 240, and a controller 250.

The monitoring tool 230 may monitor the operation of the shakers 200, the status of the screen assemblies within the shakers 200, and/or the status of fluids and solids being separated in the shakers 200. The analyzer 240 may be operatively coupled to the shaker 200, and may analyze a property of the fluid and/or solids. The controller 250 may control the actuated arm 220 and/or may control an operational parameter of the shaker 200 based, at least in part, on the monitoring of the monitoring tool 230.

In some examples, the actuated arm 220 may be controllable and capable of sensing conditions within the shaker room 215 or the shakers 200, determining properties of the shakers 200, sensing conditions of the screen assemblies in the shakers 200, and/or analyzing fluids and solids being processed by the shakers 200. For example, the actuated arm 220 may include sensor(s) to measure a position and/or orientation of the actuated arm 220, may include sensor(s) to inspect the shaker room 215, the shakers 200, and the screen assemblies, and/or may include sensor(s) that may be able to measure properties of the drilling fluid and/or surrounding environment. Example sensors may include any sensor known in the art. In some examples, a sensor may be able to communicate the position of the actuated arm 220 and the controller 250 may be able to send signals to control an actuator, thereby enabling the actuator to move the actuated arm to a desired position or orientation to effectuate an action. Those having ordinary skill in the art will appreciate that other arrangements for an actuator to move an actuated arm or a component thereof in accordance with examples disclosed herein may be used without departing from the scope of the present disclosure.

In some examples, the monitoring tool 230 may include a camera, a video camera, an imaging device, and/or a sensor. A camera and/or video camera may produce a real-time image of the shaker room 215 and/or the shaker 200, and may transmit the real-time image to the controller 250. In response to receiving and/or analyzing the real-time image, the controller 250 (or a human operator operating controller 250 at a control terminal) may control the actuated arm 220 to remove, inspect, replace, repair, clean, and/or install screen assemblies.

In some examples, the monitoring tool 230 may include an imaging device operative to identify tears or holes in the mesh of a screen assembly. For example, the actuated arm 220 may remove a screen assembly from the shaker 200. The actuated arm 220 may have a clamping mechanism coupled to its end such that the clamping mechanism may temporarily hold a screen assembly to remove it from the shaker 200. The imaging device of the monitoring tool 230 may inspect the mesh of the screen assembly to identify any tears or holes that are larger than a predetermined size. In the event that a tear or hole exceeding the predetermined size is identified by the monitoring tool 230, the controller 250 may cause the actuated arm 220 to discard the damaged screen assembly so it may not be used in the shakers 200 again. In this manner, the screen assemblies may be visually inspected via the monitoring tool 230.

To assist in the inspection of the screen assemblies, the actuated arm 220 may move the screen assembly near a light source 225 such that the light emitted from the light source 225 shines through the mesh of the screen assembly. In some examples, the light source 225 may be located adjacent the shakers 200 in the shaker room 215. In some examples, the light source 225 may include a light box or light table that emits light toward the monitoring tool. In this manner, the screen assembly may be backlit as seen from the monitoring tool 230.

The light source 225 may improve the monitoring tool's 230 ability to detect tears and holes in the mesh of the screen assembly. Based on the monitoring tool 230, the controller 250 (or an operator of the controller 250 at a control terminal) may determine that a tear or hole exists in the mesh and/or exceeds a predetermined size based on the amount of light that is shining through the mesh. A tear or hole in the mesh allows more light to shine through relative to mesh that is not damaged. This relative change in the amount of light shining through the mesh makes it easier to accurately identify tears and holes. Areas of greater light shining through are likely tears or holes.

The monitoring tool 230 may measure the amount of light shining through the mesh at multiple points to identify areas in which more light shines through the mesh. In some examples, the actuated arm 220 moves the monitoring tool 230 in a pattern (e.g., a grid) across the mesh to uniformly measure the light throughput in the mesh. Based on the light throughput, the monitoring tool 230 may determine the length and width of tears and/or the size of holes in the mesh to determine if they exceed acceptable values. When the monitoring tool 230 identifies an area of relatively greater light shining through the mesh, it may determine that the mesh of the screen assembly is damaged and may discard the screen assembly.

In some examples, the light source 225 may be coupled to or integrated with the actuated arm 220 or the monitoring tool 230. In this manner, the screen assembly may be front lit as seen from the monitoring tool 230. The monitoring tool 230 may include sensors that may measure reflected light and may identify areas of the mesh that are not reflecting the same amount of light. Areas that are not reflecting as much light as other areas may indicate tears or holes in the mesh. In some examples, the actuated arm 220 moves the monitoring tool 230 in a pattern (e.g., a grid) across the mesh to uniformly measure the light reflected by the mesh. Based on the reflected light, the monitoring tool 230 may determine the length and width of tears and/or the size of holes in the mesh to determine if they exceed acceptable values.

In some examples, the actuated arm 220 may change the screen assemblies in the shakers 200 periodically to maximize screening efficiency and to promote even wear on the screen assemblies. For example, a screen assembly installed near the inlet end of the shaker 200 may receive more wear than a screen assembly installed near the outlet end of the shaker 200. The monitoring tool 230 may track the amount of time that a screen assembly has been installed in one position or location. Based on this amount of time, the controller 250 may cause the actuated arm 220 to remove the screen assembly from the shaker 200 and move the screen assembly to another position or location in the shaker 200. In the above example, the controller 250 may cause the actuated arm 220 to move the screen assembly near the inlet to the screen position near the outlet, and may move the screen assembly near to the outlet to the screen position near the inlet. This may allow for more even wear on screen assemblies, thus improving the useful life of the screen assemblies.

The monitoring tool 230 may inspect the mesh size of screen assemblies installed in the shakers 200 or of replacement screen assemblies for future installation in the shakers 200. In some examples, the monitoring tool 230 may determine that the mesh sizes of the screen assemblies installed in the shakers 200 may be different (e.g., the inlet screen assembly has a larger mesh size than the outlet screen assembly). Therefore, switching or repositioning of screen assemblies may not be appropriate, as screening efficiency or shaker operation may be negatively affected. In this case, the controller 250 may cause the actuated arm 220 to replace screen assemblies with replacement screen assemblies with like mesh sizes to continue operating the shakers 200 effectively while maintaining uniform wear of screen assemblies.

In some examples, the monitoring tool 230 and controller 250 may track the location and/or usage of screen assemblies. This process may include collecting and storing information about each screen assembly such as its mesh size, the location in the shaker 200 where the screen assembly was installed, the amount of time the screen assembly has been in used in the shaker 200, conditions in the shaker 200 when the screen assembly was in use, damage to the screen assembly, and/or failures of the screen assembly. This information may be collected and stored in a database. In some examples, multiple shakers may collect and store information in the same database. This collected data may be used to predict when screen assemblies under similar conditions may be expected to fail. Algorithms may be generated to predict an expected screen assembly failure based on analysis of this collected data. In this manner, screen assemblies may be withdrawn from service prior to such failure and thus the shakers 200 may have increased operation time.

In some examples, the monitoring tool 230 may determine a quantity and a characteristic of solids being separated from fluid by the shaker 200. Some example characteristics may include texture, color, and size of the solids. The monitoring tool 230 may also determine a beach and/or pool depth of fluid on the screen mesh. The controller 250 may cause the actuated arm 220 to adjust or replace the screen assemblies based on the characteristics of solids or the beach or pool depth of the fluid on the screen mesh.

The analyzer 240 may determine properties of fluid and/or solids. Some example properties may include a physical property (e.g., density, temperature, flow rate, hardness, viscosity, mass), a chemical property, and a mineralogical property. In some examples, the monitoring tool 230 and the analyzer 240 may be integrated in a single component (e.g., device coupled to the actuated arm 220).

In some examples, a collection tool and rinsing tool may be coupled to the actuated arm 220. The collection tool may collect a sample of the solids and/or fluid. A time stamp of the day and time the sample was collected may be recorded to identify the sample. The rinsing tool may rinse the sample with a fluid after collection of the sample. For example, the actuated arm 220 may include a nozzle disposed thereon to emit a cleaning fluid therefrom, such as water or another cleaning fluid.

In some examples, an x-ray fluorescence device may be provided. The x-ray fluorescence device may determine an amount of low gravity solids and an amount of high gravity solids in the fluid. The x-ray fluorescence device may analyze the fluid entering the shaker and the fluid exiting the shaker, and compare the amount of the low gravity solids and the high gravity solids in the fluid entering the shaker with the amount of the low gravity solids and the high gravity solids in the fluid exiting the shaker. Based on this comparison, the controller 250 may adjust or replace the screen assemblies and/or control an operational parameter of the shaker 200.

In some examples, the monitoring tool 230 may include gas sensor(s) which may measure the amount of certain gasses present in the shaker room 215 or surrounding environment. Some examples gasses may include $H_2S$, $CH_2$, $CH_4$, among others. The amount of certain gasses in the shaker room 215 may increase safety risks and/or may assist an operator in understanding the content of the reservoir being drilled.

In some examples, fluid and solids may be monitored and/or analyzed prior to entering the shaker 200, while being processed by the shaker 200, and/or after exiting the shaker 200. In this manner, quantities, characteristics, and properties may be compared at various stages of the shaker's separation process. This may allow an operator to determine the efficiency of the shaker 200, and may provide insight into any operational parameters of the shaker 200 that may need adjusting.

The controller 250 may be in electrical communication with the monitoring tool 230 and/or the analyzer 240, and may adjust or replace the screen assemblies or may control an operational parameter of the shaker 200 based on the quantity, the characteristic, and/or the property. Some example operational parameters of the shaker 200 may include a flow rate of fluid entering the shaker 200, an angle of a screen assembly installed in the shaker 200, vibrational speed of the shaker 200, and the vibrational pattern of the shaker 200. By controlling one or more operational parameters, the efficiency, productivity, and/or throughput of the shaker 200 may be controlled.

In some examples, the controller 250 may be in electrical communication with a drilling operation 270 (e.g., drilling activities, wellbore plan), and may control an operational parameter of a drill and/or tool string based on the quantity, the characteristic, and/or the property. Some example operational parameters of the drill include a drill bit speed and revolutions per minute. By controlling one or more operational parameters of a drill and/or tool string, the efficiency, productivity, and/or throughput of drill and/or tool string may be increased. In some examples, a wellbore plan may be revised based on the quantity, the characteristic, and/or the property.

In some examples, the controller 250 may control the operation of the shaker 200, drill bit, and/or drilling activities based upon a measured or sensed amount of low gravity solids (LGS) in the fluid in the shaker 200. For example, the controller 250 may adjust the operation of the shaker 200 if the LGS amount is greater than a threshold amount and/or less than a threshold amount. Based on the amount of LGS in the fluid, the controller 250 may cause screen assemblies to be changed and/or adjusted to increase and/or decrease the screening of LGS from the fluid. This may be achieved, for example, by switching to finer mesh screen assemblies (e.g., screen assemblies with smaller openings) or coarser mesh screen assemblies (e.g., screen assemblies with larger openings). In some examples, the controller 250 may incorporate solids control equipment such as a centrifuge to remove LGS from the fluid. In some examples, controller may cause LGS reduction techniques to be applied to the fluid. For example, the fluid may be diluted by the addition of fresh fluid to reduce the LGS amount.

In some examples, the controller 250 may control the operation of the shaker 200, drill bit, and/or drilling activities based upon a measured or sensed mineralogy of the fluid or solids therein. For example, mineralogy data may be transmitted to the mudlogging operator and/or the mud engineer. This data may be used in the well plan to determine the type and properties of drilling fluid required as well as rate of penetration (ROP), bit speed, and other drilling parameters. If finer solids need to be removed from the mud system, the controller 250 may cause the screen assemblies to be removed and replaced with finer mesh screen assemblies. In some examples, the type of formation being drilled may be determined based on the mineralogy, which may help calibrate the geological and earth models of the overburden formation and reservoir. In some examples, the controller 250 may receive mineralogical information of the fluid or solids via a laser device configured to analyze such information.

In some examples, the controller 250 may control the operation of the shaker 200, drill bit, and/or drilling activities based upon a measured or sensed mass of the solids and/or the flow rate of the fluid. For example, the controller 250 may adjust the operation of the shaker 200 if the mass of the solids and/or the flow rate of the fluid is greater than a threshold amount and/or less than a threshold amount. Based on the mass of the solids and/or the flow rate of the fluid, for example, the controller 250 may cause fluid to be distributed or routed to another shaker. If the mass of solids and/or fluid flow rate is deemed to be too high for the shaker 200, then flow may be distributed evenly to other shakers so that fluid loss is minimized at the discharge end of the shaker 200. In some examples, the controller 250 may cause the angle of incline of the screen assemblies in the shaker 200 to be adjusted (e.g., increased) to accommodate higher flow rates. In some examples, the mass of the solids and/or the flow rate of the fluid may also indicate wellbore stability problems that may indicate that the wellbore is collapsing or shredding more rock into the wellbore. The controller 250 may transmit this information to potentially modify drilling activities in the wellbore.

In some examples, the controller 250 may control the operation of the shaker 200, drill bit, and/or drilling activities based upon a sensed or observed color of the solids and/or the fluid. The controller 250 may transmit sensed or observed color data to a mudlogging company and/or mud engineer. This data may be used to determine characteristics of the formation being drilled and/or well depth. In response to the characteristics of the formation being drilled and/or well depth, the controller 250 may then control the operation of the shaker 200, drill bit, and/or drilling activities.

In some examples, the controller 250 may control the operation of the shaker 200, drill bit, and/or drilling activities based upon a quantity of solids in or exiting the shaker 200. For example, the controller 250 may adjust the operation of the shaker 200 if the quantity of solids is greater than a threshold amount and/or less than a threshold amount. Based on the quantity of solids, the controller 250 may cause screen assemblies to be changed and/or adjusted to increase and/or decrease the screening of solids from the fluid. If the size of the solids exiting the shaker 200 is larger than a predetermined value (e.g., the size of the holes in the screen mesh), this may indicate that there is a hole in the screen(s). In that case, screen assemblies may be inspected, repaired, and/or replaced by the actuated arm via the controller 250. In some examples, the quantity of solids may indicate improved hole cleaning. For example, drill cuttings may form in essence dunes as the cuttings progress up the wellbore. Adjusting fluid properties and pump rate may move such dunes to the surface to ensure a clean wellbore for further operations.

In some examples, the controller 250 may include a computerized controller with or without a human operator. In some examples, the controller 250 may be located remotely from the shaker 200 and/or the shaker room 215. In some examples, the controller 250 may directly and/or indirectly control other equipment or processes to process the fluid before, during, or after the fluid enters the shaker 200 and/or the shaker rom 215.

Figure 7:
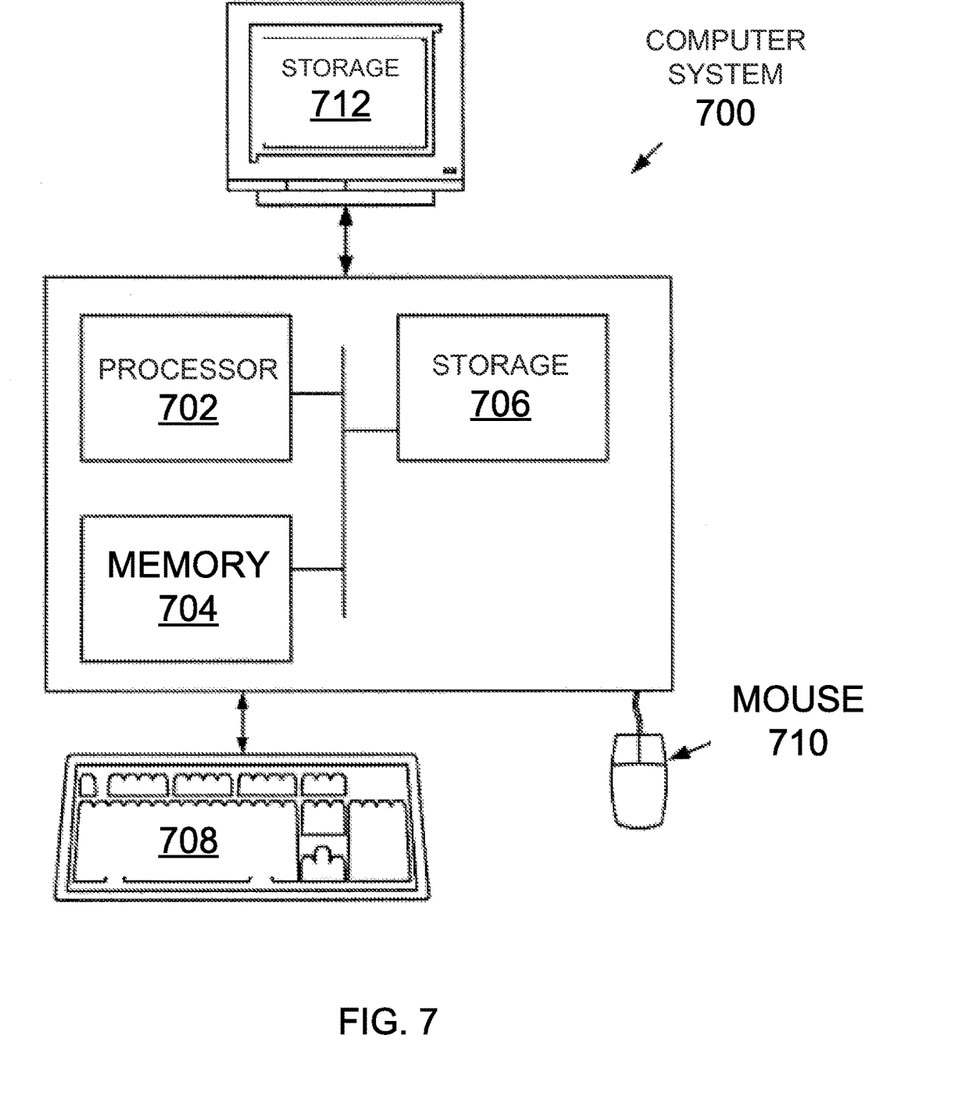
FIG. 7 is an example monitoring and control system; each arranged in accordance with at least an example of the present disclosure.

One or more examples of the present disclosure may be implemented on any type of computer system. The controller 250, for example, may be a computer system. For example, as shown in FIG. 7, a computer system 700 may include a processor 702, associated memory 704, a storage device 706, and numerous other elements and functionalities typical of known computers. The memory 704 may include instructions for causing the computer system 700 to observe and/or control processes for an actuated arm, one or more shakers, and one or more drilling operations in accordance with some examples of the present disclosure.

The computer system 700 may also include input means, such as a keyboard 708 and a mouse 710, and output means, such as a monitor 712. The computer system 700 may be connected to a local area network (LAN) or a wide area network (e.g., the Internet) via a network interface connection. Those skilled in the art will appreciate that these input and output means may take other forms, now known or later developed.

Further, those skilled in the art will appreciate that one or more elements of the computer system 700 may be located at a remote location and coupled to the other elements over a network. Some examples may be implemented on a distributed system having a plurality of nodes, where portions of the present disclosure may be located on a different node within the distributed system. In some examples, the node corresponds to a computer system. Alternatively, the node may correspond to a processor with associated physical memory. The node may alternatively correspond to a processor with shared memory and/or resources. Further, software instructions to perform some examples of the present disclosure may be stored on a tangible computer readable medium such as a digital video disc (DVD), compact disc (CD), a diskette, a tape, or any other suitable tangible computer-readable storage device.

Figure 3:
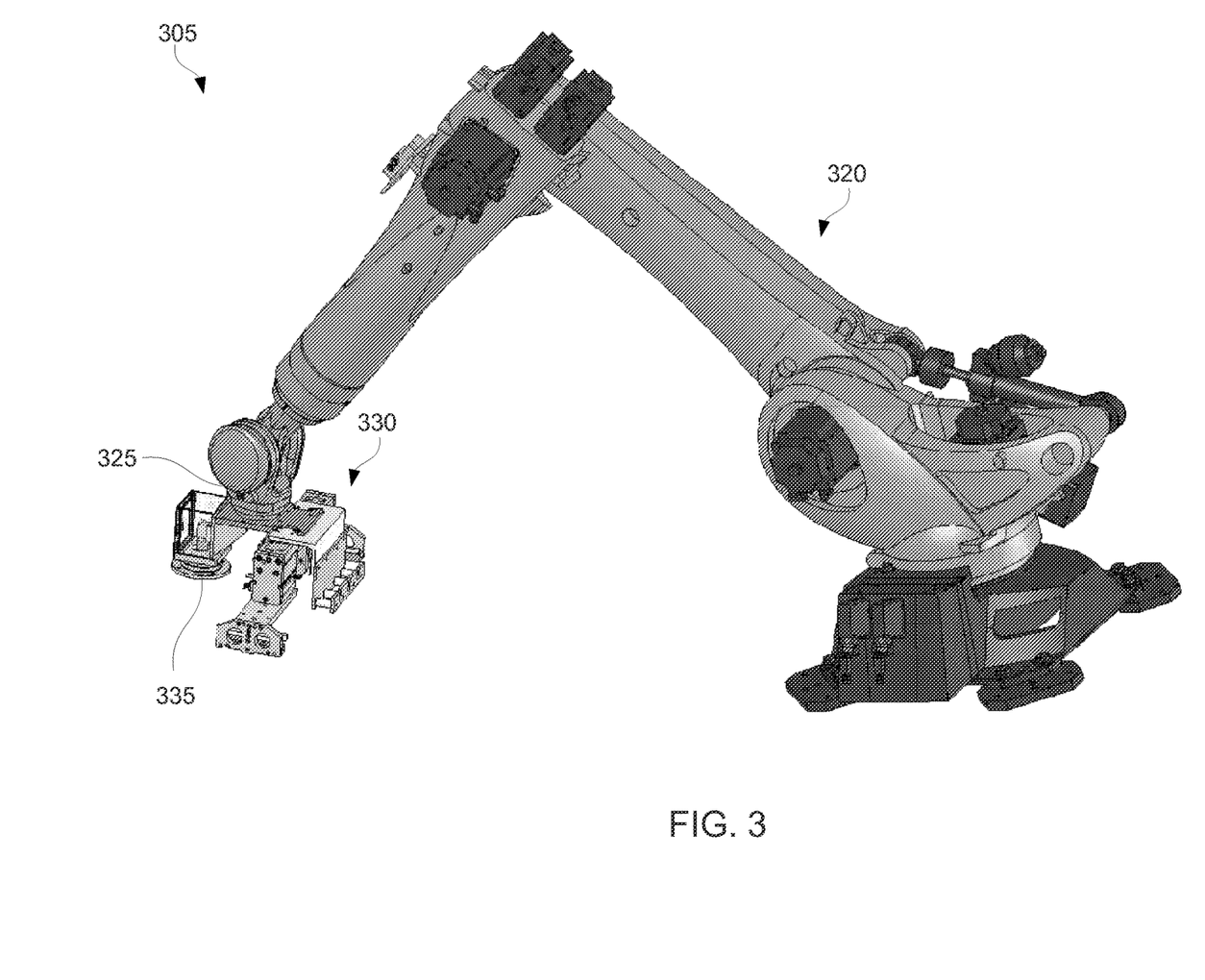
FIG. 3 is a perspective view of another example shaker monitoring system.
Figure 4:
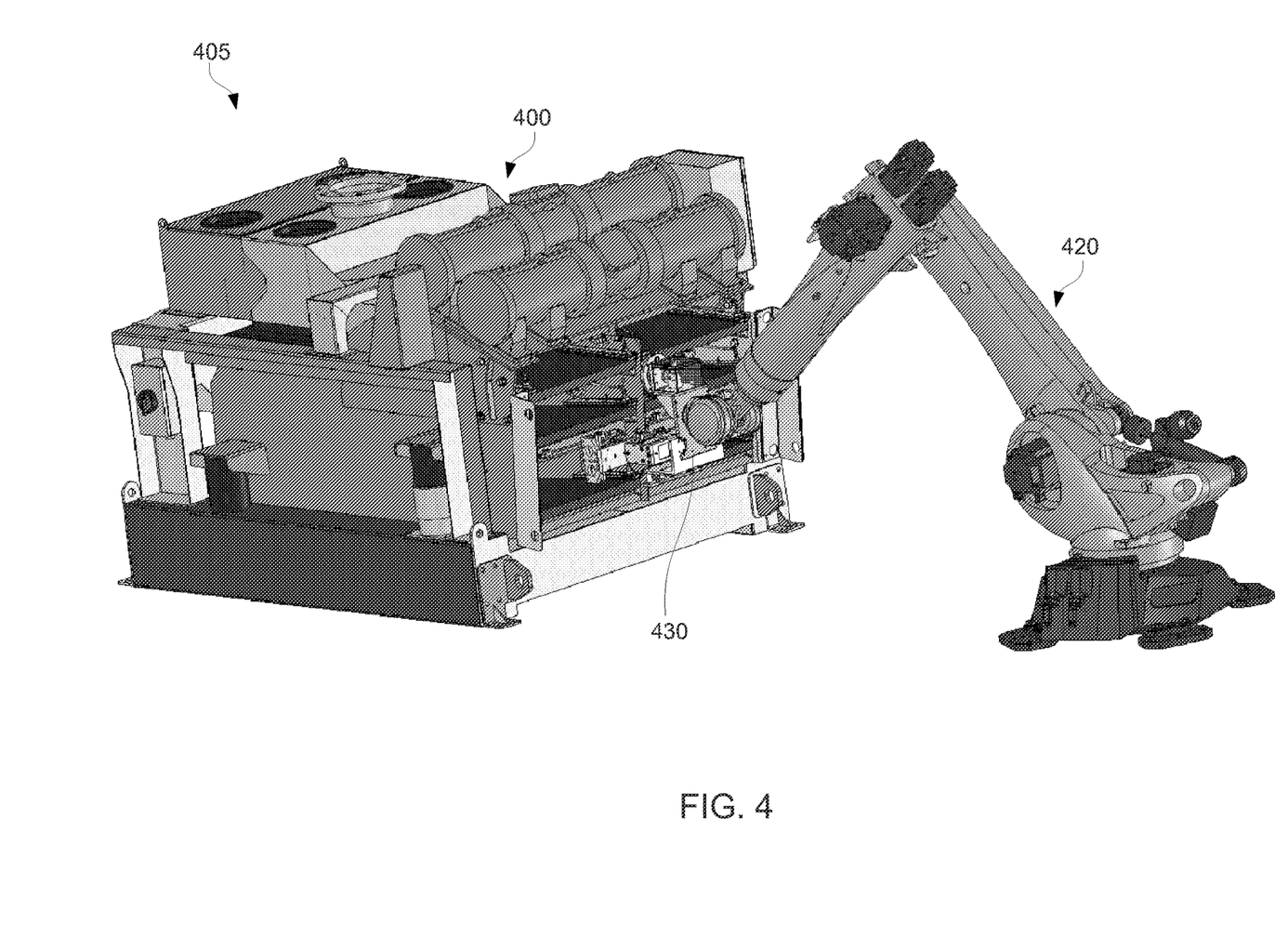
FIG. 4 is a perspective view of another example shaker monitoring system monitoring a shaker.

FIGS. 3 and 4 depict detailed perspective views of example shaker monitoring systems 305, 405. FIGS. 3 and 4 show example monitoring tools 330, 430 coupled to actuated arms 320, 420, respectively. The actuated arms 320, 420 may include articulated arms having joint(s). In some examples, monitoring tools 330, 430 may be coupled to the actuated arms 320, 420 at an end 325 of the actuated arms 320, 420. As shown in FIG. 3, the monitoring tools 330, 430 may include many tools and/or devices, including, for example, a housing having a camera 335 configured to inspect the shaker, screen assemblies, and/or fluids and solids.

Figure 5:
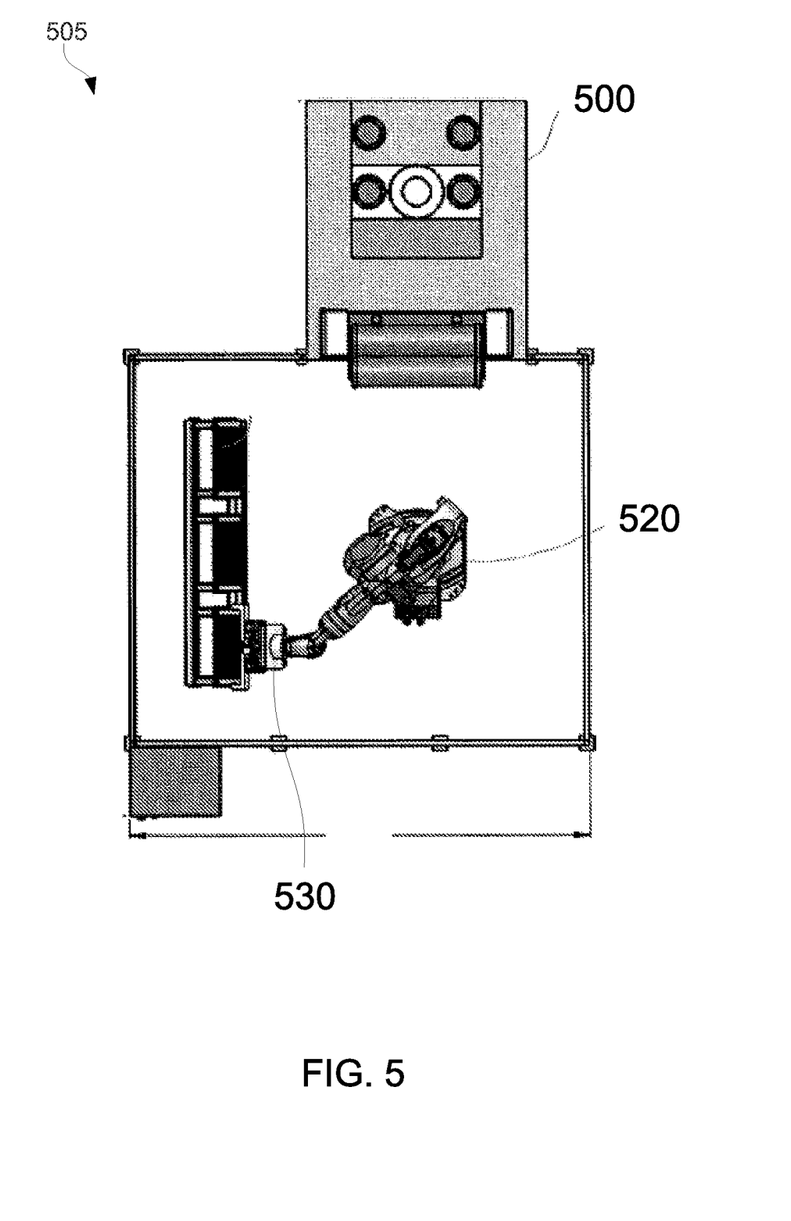
FIG. 5 is a top view of another example shaker environment.
Figure 6:
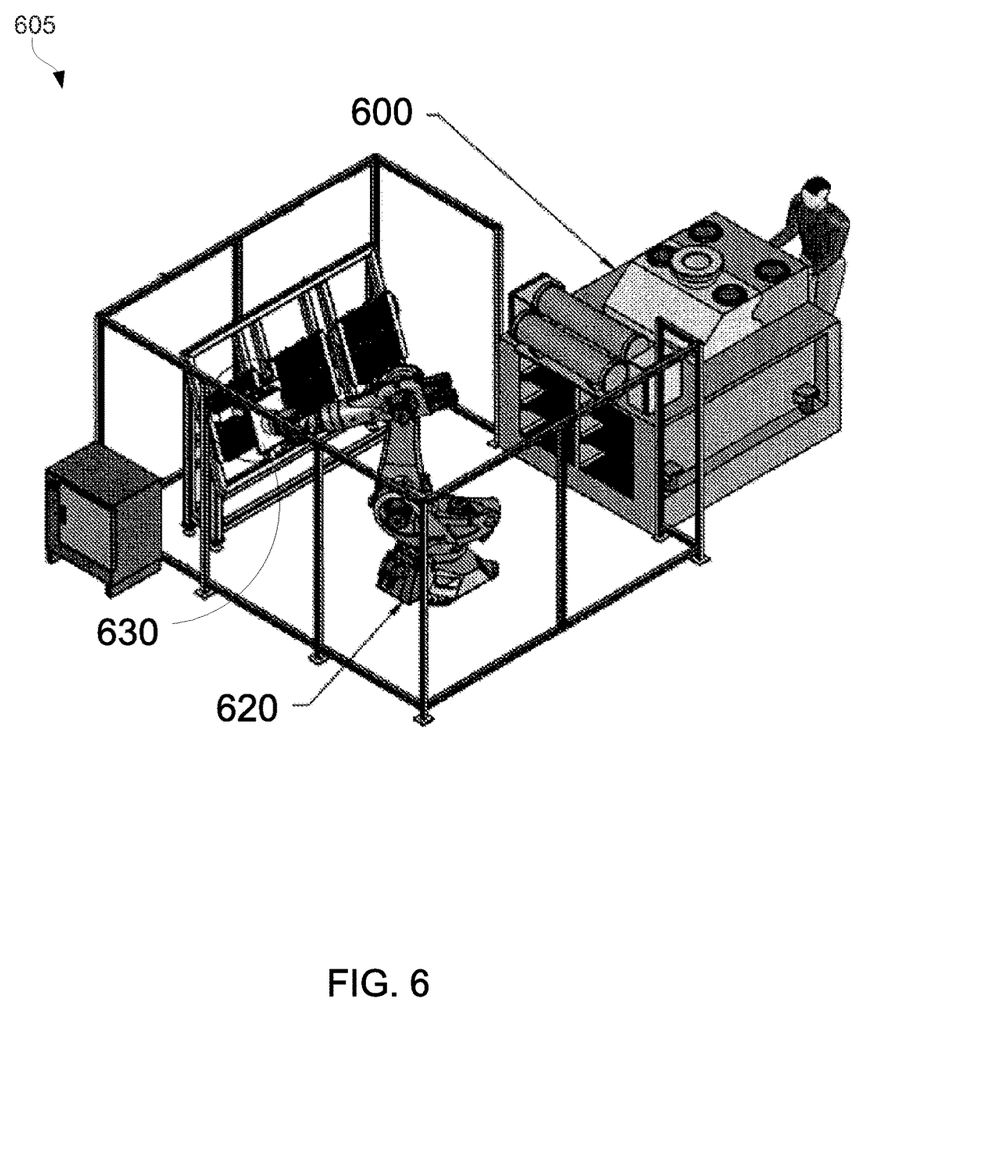
FIG. 6 is a perspective view of yet another example shaker environment.

FIGS. 5 and 6 depict a top view and a perspective view, respectively, of some example shaker environments 505, 605, arranged in accordance with some examples of the present disclosure. Some examples may include a shaker 500, 600, a monitoring tool 530, 630 coupled to an actuated arm 520, an analyzer, and/or a controller.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:
1. A method, comprising:
    monitoring, using a monitoring tool, an amount of fluid containing one or more solids in a shaker for separating the one or more solids from the fluid, wherein the monitoring tool is coupled to an end of an actuated arm adjacent the shaker, wherein the actuated arm is opera- tively coupled to the shaker such that the actuated arm is operable with or usable in conjunction with the shaker;

moving the monitoring tool with respect to a screen assembly in the shaker by moving the end of the actuated arm adjacent the shaker;

determining one or more solids property, including at least one of a quantity, a texture, a color, a size, a physical property, a chemical property, and a mineralogical property of the one or more solids;

determining one or more fluid property, including at least one of a quantity, a color, a size, a physical property, and a chemical property of the fluid; and controlling, via a controller in electrical communication with the actuated arm and the monitoring tool, the actuated arm to adjust a position of the screen assembly with respect to the shaker based at least in part on the determined one or more solids property and the determined one or more fluid property.

2. The method of claim 1, wherein controlling the actuated arm includes at least one of:
removing the screen assembly from the shaker;
replacing the screen assembly;
inspecting the screen assembly for damage; and
adjusting an angle of the screen assembly in the shaker.

3. The method of claim 1, further comprising:
emitting light through the screen assembly; and
identifying damage to the screen assembly based on an amount of emitted light through the screen assembly.

4. The method of claim 1, wherein controlling the actuated arm occurs without intervention of a human operator.

5. The method of claim 1, further comprising:
collecting a portion of the one or more solids prior to discharging the one or more solids from the shaker; and
rinsing the collected portion of the one or more solids with a liquid.

6. The method of claim 1, further comprising:
determining, using an x-ray fluorescence device, an amount of low gravity solids and an amount of high gravity solids in the fluid.

7. The method of claim 1, further comprising:
comparing an amount of low gravity solids and an amount of high gravity solids in the fluid entering the shaker with an amount of low gravity solids and an amount of high gravity solids in the fluid exiting the shaker.

8. A system, comprising:
an actuated arm adjacent a shaker for separating one or more solids from a fluid and operatively coupled to the shaker such that the actuated arm is operable with or usable in conjunction with the shaker;
a monitoring tool coupled to an end of the actuated arm adjacent the shaker such that the monitoring tool is movable with respect to the shaker by moving the end of the actuated arm adjacent the shaker, the monitoring tool comprising at least one selected from a camera and a video camera adapted to monitor a screen assembly in the shaker;
a controller in electrical communication with the actuated arm and the monitoring tool, the controller adapted to control the actuated arm based on the monitoring of the screen assembly by the at least one selected from the camera and the video camera of the monitoring tool.

9. The system of claim 8, further comprising:
a light source adapted to emit light through a mesh of the screen assembly; and
wherein the monitoring tool is further adapted to measure the light emitted through the mesh of the screen assembly.

10. The system of claim 9, wherein the monitoring tool identifies damage to the mesh of the screen assembly based on an amount of light emitted through the mesh.

11. The system of claim 10, wherein the monitoring tool identifies a hole in the mesh of the screen assembly based on a relative increase in light being emitted through the mesh.

12. The system of claim 8, wherein the monitoring tool further comprises a sensor.

13. The system of claim 8, wherein the controller is adapted to control the actuated arm based on an amount of fluid on the screen assembly.

14. The system of claim 13, wherein the amount includes a pool depth of the fluid.

15. The system of claim 8, wherein the controller causes a clamping mechanism coupled to the end of the actuated arm to at least one of temporarily hold, remove and replace the screen assembly of the shaker.

16. The system of claim 8, further comprising:
an analyzer adapted to analyze a property of at least one of the fluid and the one or more solids, the property including at least one of a physical property, a chemical property, and a mineralogical property.

17. The system of claim 8, wherein the actuated arm comprises at least two articulated arms having at least one joint positioned between the at least two articulated arms of the actuated arm.

18. The system of claim 15, wherein the monitoring tool is coupled to the actuated arm at the end of the actuated arm and adjacent to the clamping mechanism.

19. The method according to claim 1, wherein controlling the actuated arm includes at least:
temporarily holding the screen assembly of the shaker with a clamping mechanism coupled to the end of the actuated arm adjacent to the shaker.

* * * * *